(No Model.)
J. T. DAVIS.
REFRIGERATING AND ICE MACHINE.
No. 287,912. Patented Nov. 6, 1883.
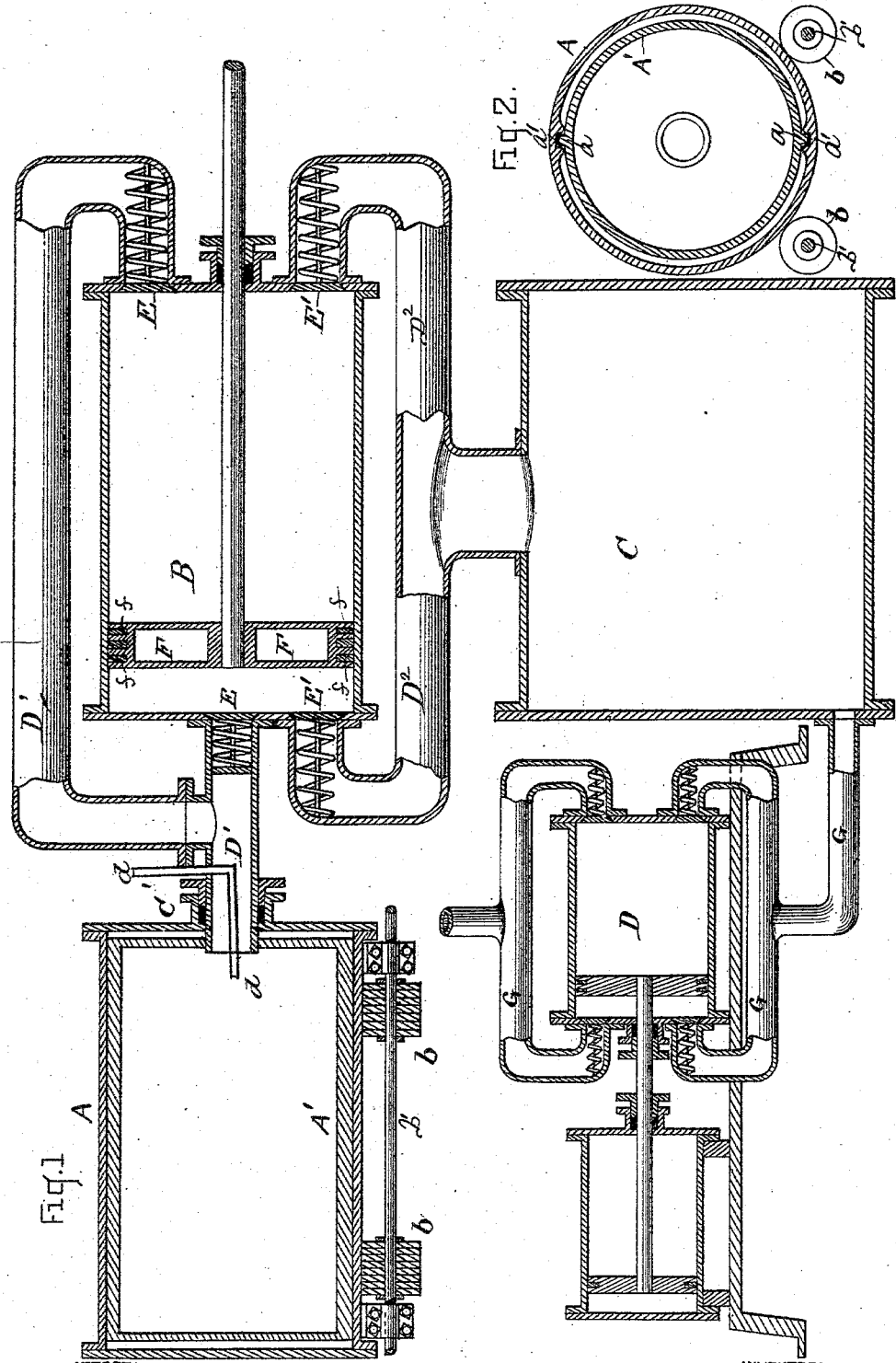
ATTEST:
INVENTOR:
Jno. T. Davis

UNITED STATES PATENT OFFICE.

JOHN T. DAVIS, OF NEW YORK, N. Y., ASSIGNOR TO LOUIS J. POUVERT, OF SAME PLACE.

REFRIGERATING AND ICE MACHINE.

SPECIFICATION forming part of Letters Patent No. 287,912, dated November 6, 1883.

Application filed July 5, 1883. (No model.)

*To all whom it may concern:*

Be it known that I, JOHN T. DAVIS, a citizen of the United States, residing at New York city, in the county and State of New York, have invented certain new and useful Improvements in Refrigerating and Ice Machines; and I do hereby declare the following to be a full, clear, and exact description of the same, reference being made to the accompanying drawings, forming a part of this specification, and in which—

Figure 1 represents a sectional elevation of my improved machine; Fig. 2, a transverse section through the refrigerating or freezing chamber.

My invention relates to certain new and useful improvements in refrigerating and ice machines; and it consists, essentially, in the combination of a revolving refrigerating or freezing chamber, an exhausting-chamber, a cooling-chamber, and a vacuum-pump, all as will be hereinafter fully described, and set forth in the claims hereto annexed.

It is a well-known law of nature that the elements of heat and air tend to an equilibrium of temperature and density, and that if the air is expelled and a vacuum formed the vacuum will at once become filled with any vapor that can reach it, so that, water being admitted, the sensible and latent heat of the water leaves the water at once to fill the vacuum, thereupon reducing the temperature to zero, and upon this law I found the principles of my improved refrigerating and freezing machine.

By exposing a given quantity of water, beer, wort, sirup, solutions, distillers' mash, or other liquids, in a continuous stream in the refrigerating-chamber, to the action of the exhausting-cylinder, condenser, and vacuum-pump, after the air has been exhausted and a vacuum is created, there is a rapid exhaustion of the caloric from the liquid thus exposed, and removed as fast as liberated until the temperature is reduced to zero.

In the formation of ice I employ a cylinder composed of an inner case, A', and outer case, A, said outer case being supported on trunnions $b\ b$, mounted on the longitudinal shafts $b'\ b'$, so as to revolve thereon. The inner case, A', is provided with exterior lugs, $a$, which are adapted to enter slots $a'$ on the interior of the outer case, A, so that the inner case is connected to and revolves with the outer case, an air-space being left between the two cases or shells A A', to prevent the inner case or shell from being affected by the outside atmosphere, the outside case or shell acting as an insulator. The heads at one end of said cases or shells have a circular aperture for the reception of the end of a pipe, D', which communicates with the opposite ends of the exhaust-cylinder B through the medium of spring-valves E. The water to be converted into ice is admitted into the inner case or shell, A', through the water-pipe $d$, which passes through the connecting-pipe D' between the revolving chamber and the exhaust-cylinder, the connection between the two allowing the freezing-chamber to revolve and the exhaust-cylinder to remain stationary, which is accomplished by a stuffing-box, C', that can be packed so as to be air-tight.

In the construction of the exhaust-cylinder I employ a piston-head, F, made as light as may be found expedient for service, and which head is provided with one or more rings, $f$, so as to insure a perfect and tight packing between the inner surface of cylinder and piston-head, said rings being made by first turning them larger than the circle to be filled, and then being cut so as to admit one end to pass the other end by cutting away one-half of the thickness of the ring for a space of one inch, more or less, as the diameter of the ring may require, the two overlapping ends making an exact section of the whole ring, and then rolling or hammering the spring into it, at the same time decreasing the size to suit the interior circumference of the cylinder to be packed, thereby securing a permanent elasticity to the spring-ring, the outward pressure of which keeps it constantly in contact with the inner surface of the cylinder.

The condenser C is connected with the opposite ends of the exhaust-cylinder B by a pipe, D², and spring-valves E' E'. This condenser C may be made of any convenient form to suit circumstances, and worked in connection with water or without. If water is used, it is introduced at the top in the form of a spray; or a series of pipes may be used, and through which water is made to circulate by any convenient method, the latter arrangement being used when the apparatus is designed for the purpose of cooling buildings, rooms, or large refrigerators.

The vacuum-pump D is connected with the condenser C by a pipe, G, and a similar arrangement of pipes and valves as is used in the exhausting-cylinder, so as to allow the piston-head to work up to the line of the head of the cylinder, thus insuring the expulsion of all the vapor in the chamber of the cylinder at every stroke of the piston.

Motion may be imparted to the pistons of the exhaust-cylinder and the vacuum-pump by any convenient means. In the present instance I have shown the piston-rod of the vacuum-pump extended through the head of the cylinder into a steam-cylinder, and having on its extended end a piston-head working in said steam-cylinder, and through the medium of which the piston-head in pump-cylinder is operated.

To more fully explain the operation of refrigerating, motion is given to the piston-heads of the exhausting-cylinder B and vacuum-pump D and the air exhausted from the entire apparatus, when a small quantity of water is introduced into the refrigerating chamber or cylinder through the pipe $d$, sufficient to cover a small section of the cylinder longitudinally to a depth of about three inches, which cylinder is then set in motion, and as it revolves the water is carried up the side of the interior shell of the cylinder and distributed in a thin stratum, its temperature being reduced to zero, when a thin film of ice is formed on the inner surface of the cylinder, and this process is continued until a block of ice of sufficient size is formed, when the head of the outer shell is removed, and then the inner shell, holding a circular block of ice, is removed from the outer shell and another shell placed therein, when the above-described operation is repeated. Care should be taken that only the same quantity of water is allowed to flow in the freezing-chamber as is frozen into ice. By this arrangement the same quantity of vapor is eliminated from the water and the power required to remove the caloric and vapor is uniform, and the ice frozen will be free from bubbles or air-holes.

In the cooling of liquids the trunnions $b$ are dispensed with and the cylinder remains stationary, and instead of the inner shell or case I substitute a system of trays, one above the other, the liquid flowing through a pipe onto the upper tray and flowing or falling by gravity onto the trays below, and so out at the bottom of the cylinder by any suitable outlet.

Having thus fully described my invention, what I claim as new, and desire to secure by Letters Patent, is—

1. In a refrigerating or ice machine, the combination of the double revolving refrigerating or freezing cylinder, an exhaust-cylinder, a condenser and vacuum-pump, and pipes and valves connecting said parts, substantially in the manner as and for the purpose herein shown and described.

2. The herein-described revolving refrigerating or freezing cylinder, composed of the outer shell, A, having interior slots or grooves, $a'$, and the inner shell, A', having exterior lugs, $a$, fitting in said slots or grooves, by which the two shells are connected and revolved together, substantially as specified.

JNO. T. DAVIS.

Witnesses:
J. TENCH DAVIS,
CHAS. E. DUNCOMB.